United States Patent
Kim

(10) Patent No.: US 7,496,381 B2
(45) Date of Patent: Feb. 24, 2009

(54) METHOD OF PREVENTING THE UNAUTHORIZED USE OF A USER IDENTIFICATION MODULE

(76) Inventor: Jang Eon Kim, 239-3, Sanbon 1-Dong, Kunpo, Kyungki-Do (KR)

( * ) Notice: Subject to any disclaimer, the term of this patent is extended or adjusted under 35 U.S.C. 154(b) by 1012 days.

(21) Appl. No.: 10/406,937

(22) Filed: Apr. 3, 2003

(65) Prior Publication Data

US 2004/0038669 A1 Feb. 26, 2004

(30) Foreign Application Priority Data

Aug. 21, 2002 (KR) .................... 10-2002-0049507

(51) Int. Cl.
*H04L 12/58* (2006.01)
*H04B 1/38* (2006.01)

(52) U.S. Cl. .................... 455/558; 455/412.1
(58) Field of Classification Search ................ 455/558, 455/412.1
See application file for complete search history.

(56) References Cited

U.S. PATENT DOCUMENTS

| | | | | | |
|---|---|---|---|---|---|
| 5,675,628 | A | * | 10/1997 | Hokkanen | 455/433 |
| 5,748,720 | A | * | 5/1998 | Loder | 455/406 |
| 5,864,757 | A | * | 1/1999 | Parker | 455/418 |
| 5,920,814 | A | * | 7/1999 | Sawyer et al. | 455/422.1 |
| 5,933,773 | A | * | 8/1999 | Barvesten | 455/558 |
| 5,933,785 | A | * | 8/1999 | Tayloe | 455/558 |
| 5,954,817 | A | * | 9/1999 | Janssen et al. | 713/169 |
| 5,956,636 | A | * | 9/1999 | Lipsit | 455/411 |
| 6,084,967 | A | * | 7/2000 | Kennedy et al. | 380/247 |
| 6,119,020 | A | * | 9/2000 | Miller et al. | 455/558 |
| 6,138,005 | A | * | 10/2000 | Park | 455/411 |
| 6,141,563 | A | * | 10/2000 | Miller et al. | 455/558 |
| 6,141,564 | A | * | 10/2000 | Bruner et al. | 455/558 |
| 6,148,192 | A | * | 11/2000 | Ahvenainen | 455/410 |
| 6,216,014 | B1 | * | 4/2001 | Proust et al. | 455/558 |
| 6,366,777 | B1 | * | 4/2002 | Uusitalo | 455/433 |
| 6,480,725 | B2 | * | 11/2002 | Cassidy et al. | 455/558 |
| 6,480,935 | B1 | | 11/2002 | Carper et al. | |
| 6,490,464 | B1 | | 12/2002 | Oda | |
| 6,529,727 | B1 | * | 3/2003 | Findikli et al. | 455/411 |
| 6,591,098 | B1 | * | 7/2003 | Shieh et al. | 455/419 |
| 6,696,919 | B1 | * | 2/2004 | Leickel et al. | 340/5.74 |
| 6,868,282 | B2 | * | 3/2005 | Carlsson | 455/558 |
| 7,137,003 | B2 | * | 11/2006 | Krishnan et al. | 713/172 |
| 7,174,159 | B2 | * | 2/2007 | Guirauton et al. | 455/411 |
| 7,286,852 | B2 | * | 10/2007 | Imura | 455/558 |
| 2001/0016502 | A1 | * | 8/2001 | Shirai | 455/558 |
| 2002/0006808 | A1 | * | 1/2002 | Onaka et al. | 455/550 |
| 2002/0120852 | A1 | * | 8/2002 | Krishnan et al. | 713/185 |

(Continued)

FOREIGN PATENT DOCUMENTS

KR        1998-66321        10/1998

*Primary Examiner*—Fan Tsang
*Assistant Examiner*—Lisa Hashem

(57) ABSTRACT

A method of preventing unauthorized use of a user Identification module (UIM) is provided. The method comprises attaching a UIM previously used with a first communication terminal to a second communication terminal, wherein the UIM is configured to have first and second card holder verification (CHV) states; authenticating the second communication terminal and the UIM regardless of whether the UIM is in the first or the second verification states. The authenticating step may comprise determining an electronic serial number (ESN) of the second communication terminal; and comparing the ESN of the second communication terminal with an ESN of the first communication terminal.

15 Claims, 3 Drawing Sheets

U.S. PATENT DOCUMENTS

2002/0165008 A1* 11/2002 Sashihara et al. ........... 455/558
2002/0197991 A1* 12/2002 Anvekar et al. ............. 455/432
2005/0250536 A1* 11/2005 Deng et al. ................. 455/558

* cited by examiner

METHOD OF PREVENTING THE UNAUTHORIZED USE OF A USER IDENTIFICATION MODULE

CROSS REFERENCE TO RELATED APPLICATION

Pursuant to 35 U.S.C. §119(a), this application claims the benefit of earlier filing date and right of priority to Korean Patent Application No. 2002-49507, filed on Aug. 21, 2002, the content of which is hereby incorporated by reference herein in its entirety.

BACKGROUND OF THE INVENTION

1. Field of the Invention

The present invention relates to an user Identification module (UIM) of a mobile communication terminal, and in particular to a method for preventing unauthorized use of an UIM.

2. Description of the Related Art

In general, an UIM (User Identification Module also known as a "SIM card") is an IC (Integrated Chip) card module inserted into a terminal, and it is commonly used for a global system for mobile communication (GSM) terminal in Europe. An UIM technique applies a security function as a major advantage of an IC card to a CDMA terminal and provides movability, storability, and authentication algorithm as characteristics of the IC card.

In more detail, the UIM is an IC card that can be attached to a terminal and consists of a microprocessor and a memory chip. The memory chip stores personal information of an UIM owner and various information (telephone number and network number) for operating the terminal, and the user (owner) can attach the UIM to another terminal supporting a SIM interface and use the UIM. In addition, when the terminal is turned on, the UIM checks enable/disable attribute of a card holder verification (CHV), when the CHV is enable, it performs user authentication operation by receiving a CHV code from the user.

Hereinafter, the user authentication operation of the terminal attached to the UIM will be described in detail.

After opening a window for changing the CHV enable/disable attribute on a user menu, the user inputs information and a CHV code for changing the CHV enable/disable attribute. When the user inputs information and the CHV code for changing the CHV enable/disable attribute, the terminal transmits the pertinent CHV code to the UIM through a command packet and requires the UIM to change the CHV enable/disable attribute.

The microprocessor of the UIM receives the CHV code as a certain kind of password and performs user authentication operation for judging whether the pertinent user is a network-registered user. When the user is validated, the microprocessor of the UIM changes the enable/disable attribute of the CHV and notifies the user of the change.

Referring to FIG. 1, when the terminal having the UIM is turned on (block S10), the terminal determines a communication protocol (block S11) and a transmission speed through negotiation with the UIM and updates operation parameters (block S12) according to the determined protocol and transmission speed.

The microprocessor of the UIM checks whether the CHV is in the enable state by reading the enable/disable attribute of the CHV (blocks S13 and S14). When the CHV is in the enable state, it receives the CHV code from the user and performs the user authentication (blocks S15 and S16). When the CHV is in the disable state, the microprocessor does not perform the user authentication operation.

As described above, when the CHV is in the enable state, whenever the terminal is turned on, the UIM receives the CHV code from the user and performs the user authentication operation repeatedly. When the CHV is in the enable state, the user has to input the CHV code for the user authentication whenever the terminal is turned on. This can be inconvenient to the user.

Accordingly, in order to bypass the above-mentioned inconvenience, the user sets the CHV of the UIM at the disable state, and accordingly the user can use the UIM freely on the user's own terminal or other people's terminals without passing the user authentication.

However, when the user loses the UIM and the CHV is in the disable state, other people may illegally use the pertinent UIM on another terminal without passing the user authentication. In addition, personal information of the user stored in the UIM may be erased.

SUMMARY OF THE INVENTION

In accordance with one aspect of the invention, a method of preventing unauthorized use of a user Identification module (UIM) comprises: attaching a UIM previously used with a first communication terminal to a second communication terminal, wherein the UIM is configured to have first and second card holder verification (CHV) states; authenticating the second communication terminal and the UIM regardless of whether the UIM is in the first or the second verification states. The authenticating step may comprise: determining an electronic serial number (ESN) of the second communication terminal; and comparing the ESN of the second communication terminal with an ESN of the first communication terminal.

In accordance with one embodiment, a method of preventing unauthorized use of a user Identification module (UIM) for a mobile communication terminal comprises: attaching an user identity module (UIM), having first and second card holder verification (CHV) states, to a communication terminal; determining whether it is a first time the terminal is attached to the UIM, when the terminal is powered on; and changing the first CHV state to the second CHV state, if it is determined that the terminal is attached to the UIM for the first time. Thereafter, the mobile communication terminal and the UIM are authenticated according to the changed CHV state.

In one embodiment, the second CHV state is an enable state requiring user authentication and the first CHV state is a disable state not requiring user authentication. The step of determining whether it is a first time the terminal is attached to the UIM comprises: determining an electronic serial number (ESN) of the communication terminal when the UIM is attached to the terminal; and comparing the ESN of the communication terminal with a stored ESN in the UIM; and determining that the terminal is attached to the UIM for the first time if the ESN of the communication terminal does not match the stored ESN in the UIM.

The step of changing the CHV state comprises: examining a CHV state of the UIM; determining whether the CHV state indicates a disable state; and changing the disable state into an enable state, if the CHV is in the disable state.

In accordance with another aspect of the invention, a method of preventing unauthorized use of a personalized UIM for use with a communication terminal, the method comprises: attaching a UIM including first Identifying information to a communication terminal having second Identifying information, wherein the UIM can be configured in a first state to require user authentication and a second state not to require user authentication before the communication terminal can be used; determining if the first and second Identifying information are different; configuring the UIM in the first state, if the first and second Identifying information are different; whereby requiring a user to enter authentication information before the communication terminal can be used.

The first Identifying information may comprise a first ESN stored in the UIM, for example. The second Identifying information comprises a second ESN associated with the communication terminal, for example.

In certain embodiments, a UIM for preventing unauthorized use of a UIM with a communication terminal comprises: a first memory for storing an ESN of a first communication terminal; and a second memory for storing information indicating a first state, wherein the first state requires the entry of authentication information before a second communication terminal, having a second ESN, attached to the UIM can be used, and wherein the first state is stored in the second memory if the first ESN is not the same as the second ESN.

In response to detecting a first state stored in the second memory, the communication terminal at start up requires a user to enter authentication information. After the authentication information is provided the second memory can be configured to store information indicating a second state, wherein the second state does not require entry of authentication information, before the second communication terminal can be used.

In accordance with yet another aspect of the invention, a logic code embedded in a computer readable medium is provided, wherein the execution of the logic code provides instruction to a processor to prevent unauthorized use of a UIM, the logic code comprising instructions for: detecting the attachment of a UIM previously used with a first communication terminal to a second communication terminal, wherein the UIM is configured to have first and second card holder verification (CHV) states; authenticating the second communication terminal and the UIM regardless of whether the UIM is in the first or the second verification states.

The logic code may further comprise instructions for: determining an electronic serial number (ESN) of the second communication terminal; and comparing the ESN of the second communication terminal with an ESN of the first communication terminal.

In certain embodiments, the logic code comprises instructions for: determining attachment of an user identity module (UIM), having first and second card holder verification (CHV) states, to a communication terminal; determining whether it is a first time the terminal is attached to the UIM, when the terminal is powered on; and changing the first CHV state to the second CHV state, if it is determined that the terminal is attached to the UIM for the first time.

The logic code may further comprise instructions for: authenticating the mobile communication terminal and the UIM according to the changed CHV state, wherein the second CHV state is an enable state requiring user authentication and the first CHV state is a disable state not requiring user authentication.

In some embodiments, the instructions for determining whether it is a first time the terminal is attached to the UIM comprises instructions for: determining an electronic serial number (ESN) of the communication terminal when the UIM is attached to the terminal; comparing the ESN of the communication terminal with a stored ESN in the UIM; and determining that the terminal is attached to the UIM for the first time if the ESN of the communication terminal does not match the stored ESN in the UIM. The instructions for changing the CHV state comprises instructions for: examining a CHV state of the UIM; determining whether the CHV state indicates a disable state; and changing the disable state into an enable state, if the CHV is in the disable state.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENT

Hereinafter, the preferred embodiment of the present invention will be described.

In one embodiment of the present invention, when a lost UIM (User Identity Module) is used in a new terminal, it is possible to prevent the unauthorized use of the UIM by changing the disable state of a card holder verification (CHV) to an enable state.

In order to perform the above-mentioned operation, the UIM waits to recognize a terminal change. According to the IS-820 standard, when the UIM is attached to a terminal, the terminal duplicates the electronic serial number (ESN) of the terminal to the UIM. Accordingly, the UIM can determine a change by comparing the ESN of the present terminal with an ESN of a previous terminal.

Figure 1:
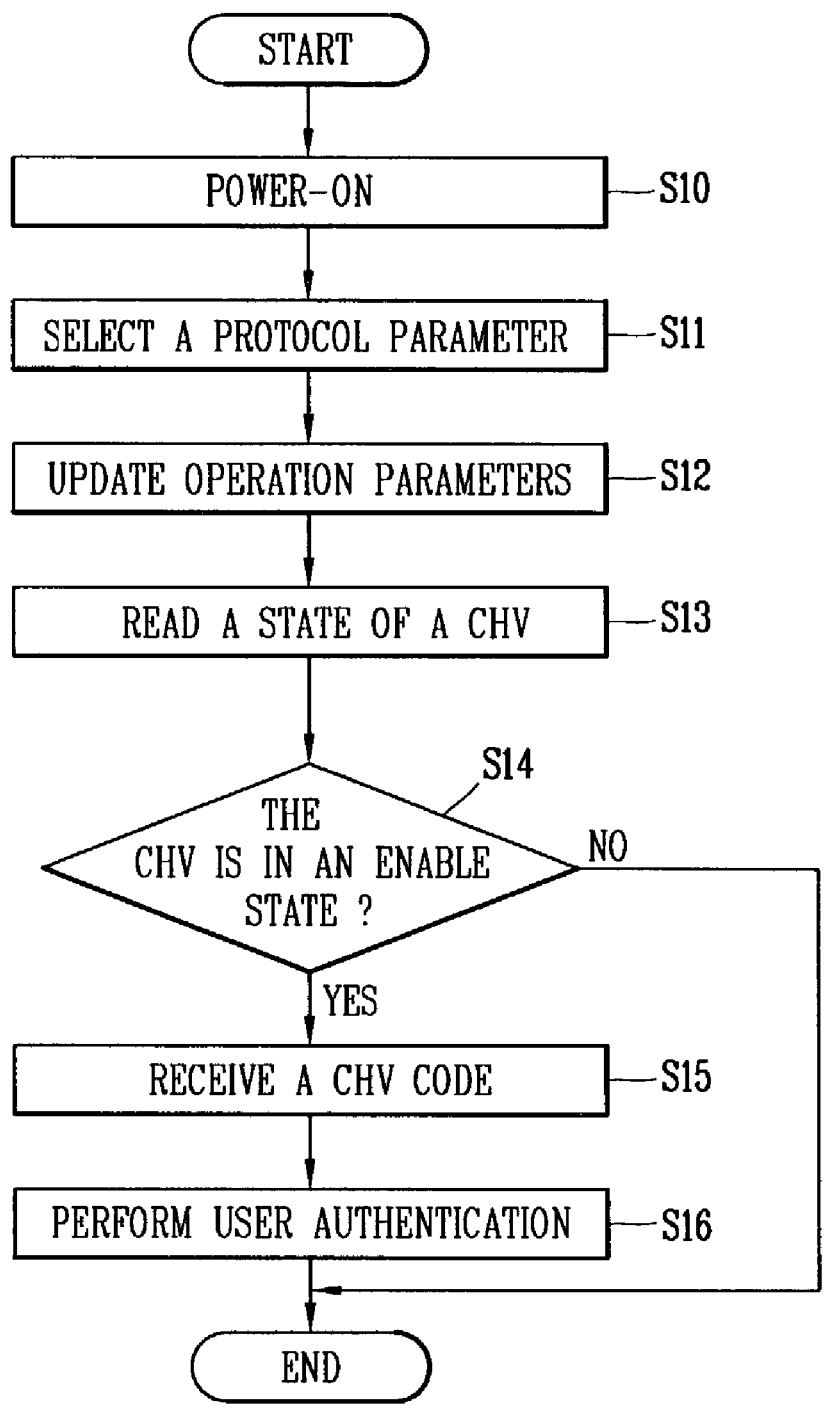
FIG. 1 is a flow chart illustrating a user authentication method of the conventional mobile communication terminal.
Figure 2:
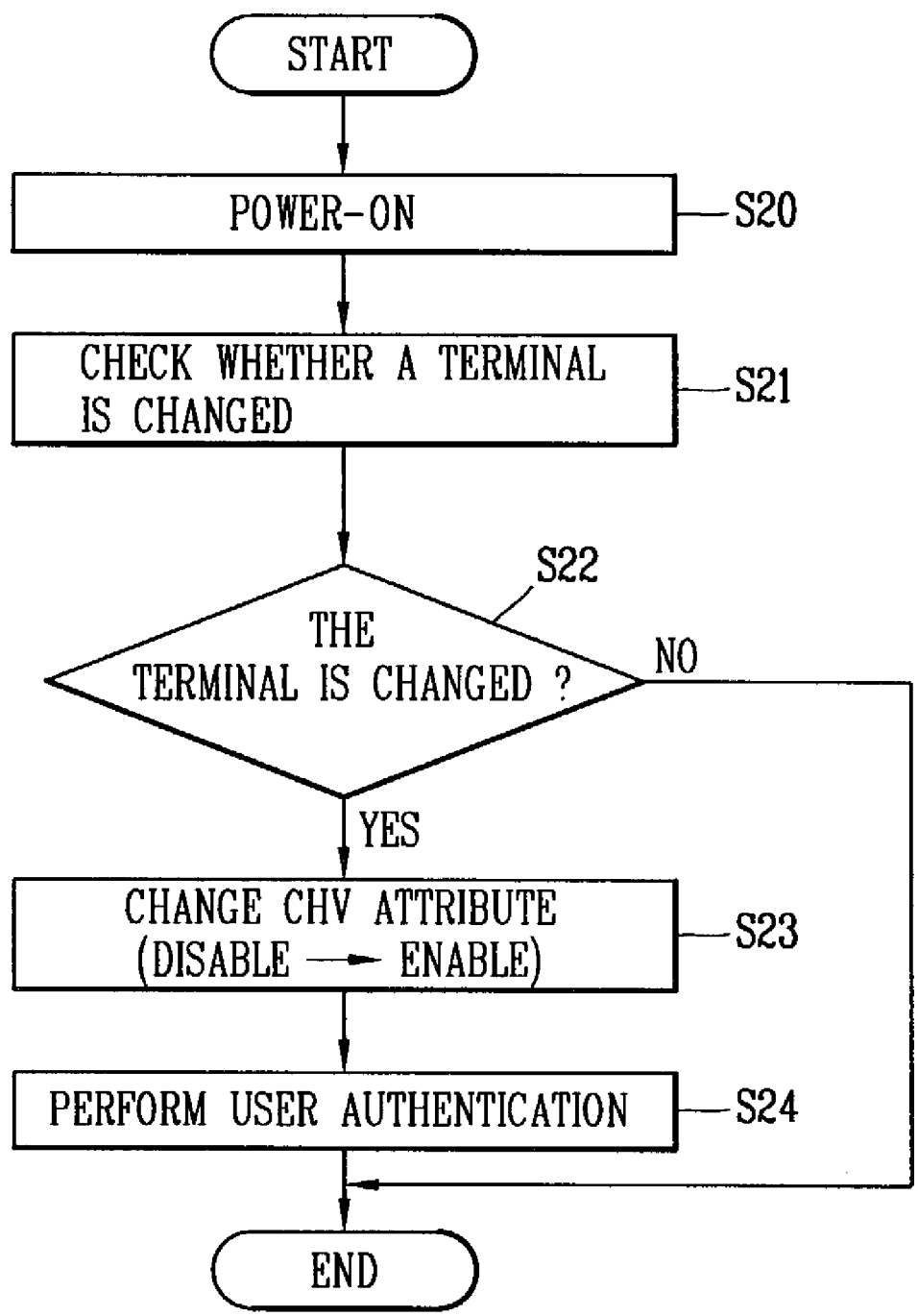
FIG. 2 is a flow chart illustrating an UIM unauthorized use restraint method of a mobile communication terminal in accordance with the present invention.

Referring to FIG. 2, when the user attaches the UIM to the CDMA terminal and turns on the terminal, the UIM checks whether the terminal is changed. If the terminal is changed, the UIM automatically changes CHV enable/disable attribute to an enable state and thereby activates user authentication operation (S20-S24).

Figure 3:
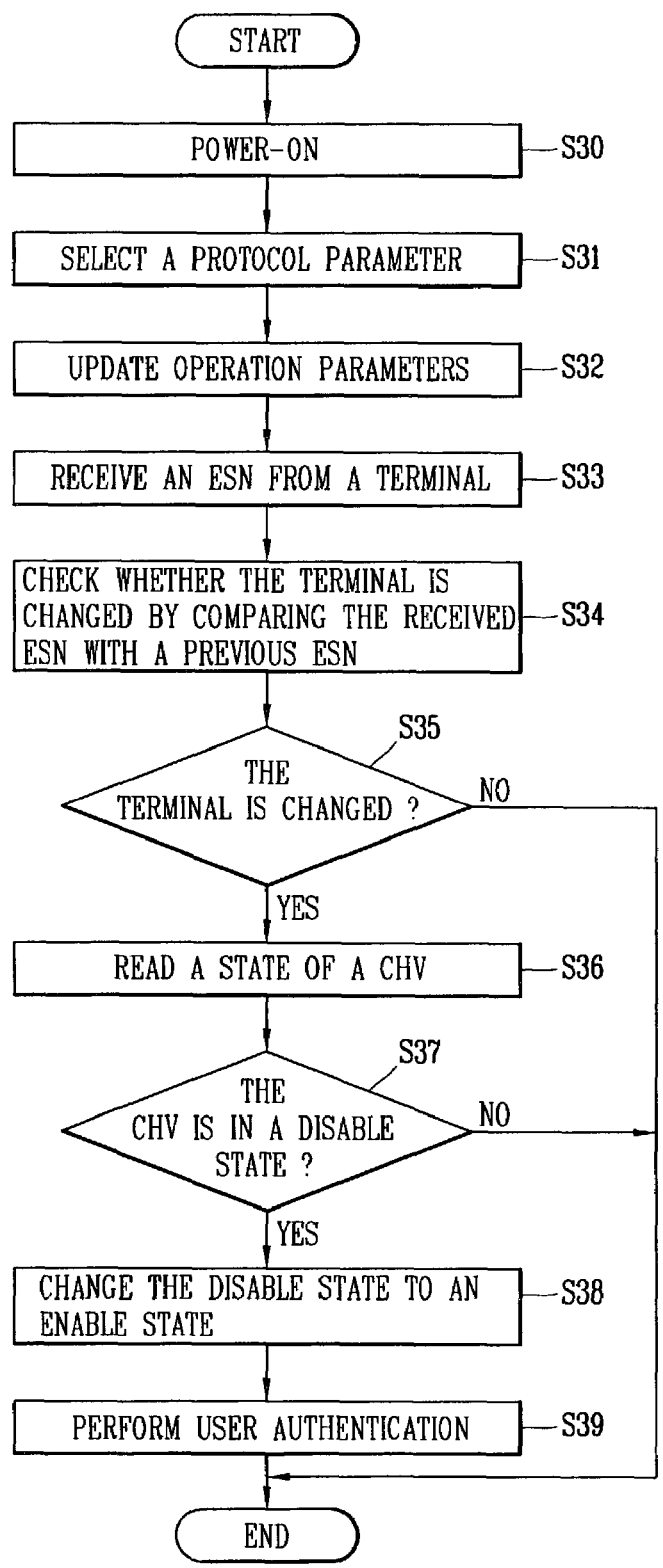
FIG. 3 is a flow chart illustrating the UIM unauthorized use restraint method of FIG. 2 in more detail.

Hereinafter, the above-mentioned process will be described in more detail with reference to FIG. 3.

When a terminal is turned on (S30), the terminal determines the communication protocol 1 and transmission speed through negotiation with the UIM (S31). The terminal updates its operation parameters according to the determined protocol and transmission speed and duplicates the terminal's assigned ESN to the UIM (S32).

The UIM stores the ESN (which, for example, is 4 bytes), compares it with a previously stored ESN and determines whether the terminal is changed (S33 and S34). If it is determined that the terminal is changed, the UIM reads the CHV state to determine if the CHV is in the disable state (S35-S37). If the CHV is in the disable state, the UIM automatically changes the disable state to an enable state (S38).

Accordingly, when an unauthorized user tries to use a UIM in a new phone, the user has to input the CHV code, and the UIM performs the user authentication operation according to the inputted CHV code (S39). If the user does not know the CHV code of the UIM, he can not use the UIM. Thus, it is possible to perform user authentication when the terminal is changed regardless of the CHV state.

As described above, when the UIM is in the CHV disable state and is attached to another terminal, the UIM recognizes that the terminal is changed and changes the CHV disable state into the CHV enable state. Accordingly, although the CHV of the UIM is in the disable state, by performing the user authentication through the CHV code on another terminal, it is possible to prevent the UIM from unauthorized use by another person.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the scope of the claims, or their equivalents are therefore intended to be embraced by the appended claims.

What is claimed is:

1. A method of preventing unauthorized use of a removable user identification module (UIM), the method comprising:
   attaching a removable UIM previously used with a first communication terminal to a second communication terminal, wherein the UIM has first and second card holder verification (CHV) states; and
   determining whether the second communication terminal is attached to the UIM for a first time when the second communication terminal is powered on; and
   changing the CHV state to require user authentication of the UIM if the second communication terminal is attached to the UIM for the first time,
   wherein determining whether the second communication terminal is attached to the UIM for the first time comprises:
   the UIM examining an electronic serial number (ESN) of the second communication terminal when the UIM is attached to the second communication terminal;
   comparing the ESN of the second communication terminal with a stored ESN in the UIM; and
   determining that the second communication terminal is attached to the UIM for the first time if the ESN of the second communication terminal does not match the stored ESN in the UIM.

2. A method of preventing unauthorized use of a user identification module (UIM), the method comprising:
   attaching the UIM, having first and second card holder verification (CHV) states, to a mobile communication terminal;
   determining whether the mobile communication terminal is attached to the UIM for a first time when the mobile communication terminal is powered on, wherein determining whether the mobile communication terminal is attached to the UIM for the first time comprises:
   determining an electronic serial number (ESN) of the mobile communication terminal when the UIM is attached to the mobile communication terminal;
   comparing, in the UIM, the ESN of the mobile communication terminal with a stored ESN in the UIM,
   wherein the comparison of the ESN of the communication terminal with a stored ESN in the UIM occurs in the UIM;
   determining that the mobile communication terminal is attached to the UIM for the first time if the ESN of the mobile communication terminal does not match the stored ESN in the UIM; and
   changing the first CHV state to the second CHV state if the mobile communication terminal is attached to the UIM for the first time.

3. The method of claim 2, further comprising:
   authenticating the mobile communication terminal and the UIM according to the changed CHV state.

4. The method of claim 2, wherein the second CHV state is an enable state requiring user authentication and the first CHV state is a disable state not requiring user authentication.

5. The method of claim 2, wherein changing the CHV state comprises:
   examining a CHV state of the UIM;
   determining whether the CHV state indicates a disable state; and
   changing the disable state to an enable state if the CHV is in the disable state.

6. A method of preventing unauthorized use of a personalized user identification module (UIM) for use with a communication terminal, the method comprising:
   attaching a removable UIM previously used with a first communication terminal including first identifying information to a second communication terminal having second identifying information, wherein the UIM can be configured in a first card holder verification (CHV) state requiring user authentication before the second communication terminal can be used or a second CHV state not requiring user authentication before the communication terminal can be used, the first identifying information comprising a first electronic serial number (ESN) stored in the UIM and the second identifying information comprising a second ESN associated with the second communication terminal;
   determining whether the second communication terminal is attached to the UIM for a first time by comparing the first ESN stored in the UIM and second ESN of the second communication terminal when the second communication terminal is powered on; and
   changing the UIM to the first CHV state if the first ESN stored in the UIM does not match the ESN of the second communication terminal.

7. A user identification module (UIM) for use with a communication terminal, the UIM comprising:
   a first memory for storing a first electronic serial number (ESN) of a first communication terminal; and
   a second memory for storing information indicating a first card holder verification (CHV) state,
   wherein the first CHV state requires the entry of authentication information before a second communication terminal with a second ESN can be used in association with the UIM if the second communication terminal has been attached to the UIM for the first time, wherein the first ESN is compared to a second ESN to determine if the second communication terminal has been attached to the UIM for the first time, and
   wherein the first state is set to a second CHV state stored in the second memory if the first ESN is not the same as the second ESN.

8. The UIM of claim 7, wherein the second communication terminal at start up requires a user to enter authentication information.

9. The UIM of claim 7, wherein after the authentication information is entered, the second memory can be configured to store information indicating a second state, wherein the second state does not require entry of authentication information before the second communication terminal can be used.

10. A communication terminal for use with a user identification module (UIM), the communication terminal comprising:
- a processing unit; and
- logic code executed by the processing unit to perform:
- detecting attachment of the UIM;
- determining if the VIM is previously used with the communication terminal, wherein the VIM is configured to have first and second card holder verification (CHV) states;
- determining an electronic serial number (ESN) of the communication terminal; and
- comparing the ESN of the communication terminal with a stored ESN of the UIM to determine if the UIM is previously used with the communication terminal; and
- changing the CHV state to require user authentication of the UIM if the ESN of the communication terminal does not match the stored ESN in the UIM.

11. A user identification module (UIM) for use with a mobile communication terminal, the UIM comprising:
- a data recording medium; and
- logic code stored in the data recording medium capable of execution by a processing unit, wherein execution of the logic code causes the processing unit to perform:
- determining attachment of the UIM, having first and second card holder verification (CHV) states, to the mobile communication terminal;
- determining whether it is a first time the mobile communication terminal is attached to the UIM when the mobile communication terminal is powered on;
- determining an electronic serial number (ESN) of the mobile communication terminal when the UIM is attached to the mobile communication terminal;
- comparing the ESN of the mobile communication terminal with a stored ESN in the UIM;
- determining that the mobile communication terminal is attached to the UIM for the first time if the ESN of the mobile communication terminal does not match the stored ESN in the UIM; and
- changing the first CHV state to the second CHV state if it is determined that the mobile communication terminal is attached to the UIM for the first time.

12. The UIM of claim 11, wherein execution of the logic code causes the processing unit to further perform:
- authenticating the mobile communication terminal and the UIM according to the changed CHV state.

13. The UIM of claim 11, wherein the second CHV state is an enable state requiring user authentication and the first CHV state is a disable state not requiring user authentication.

14. The UIM of claim 13, wherein execution of the logic code causes the processing unit to further perform:
- examining a CHV state of the UIM;
- determining whether the CHV state indicates the disable state; and
- changing the disable state to an enable state if the CHV state indicates the disable state.

15. A method of preventing unauthorized use of a removable user identification module (UIM) removed from a first communication terminal and inserted into a second communication terminal, wherein the removable UIM is configured to have first and second verification states, the method comprising:
- determining authenticity of the removable UIM in relation to the second communication terminal, requiring user authentication of the UIM, if the second communication terminal is attached to the UIM for the first time regardless of whether the UIM is in the first or the second verification state by determining an input provided to the second communication terminal, wherein determining whether the second communication terminal is attached to the UIM for the first time comprises:
- determining an electronic serial number (ESN) of the second communication terminal when the UIM is attached to the second communication terminal;
- comparing the ESN of the second communication terminal with a stored ESN in the UIM; and
- determining that the second communication terminal is attached to the UIM for the first time if the ESN of the second communication terminal does not match the stored ESN in the UIM; and
- comparing the input to the second communication terminal with an input provided to the first communication terminal.

* * * * *